United States Patent
Baruschka

(10) Patent No.: US 9,343,989 B2
(45) Date of Patent: May 17, 2016

(54) METHOD FOR CONTROLLING A CYCLOCONVERTER, ELECTRONIC CONTROL DEVICE THEREFOR, CYCLOCONVERTER, AND COMPUTER PROGRAM

(75) Inventor: Lennart Baruschka, Wedemark (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 147 days.

(21) Appl. No.: 14/232,504

(22) PCT Filed: Jul. 16, 2012

(86) PCT No.: PCT/EP2012/063878
§ 371 (c)(1),
(2), (4) Date: Jan. 13, 2014

(87) PCT Pub. No.: WO2013/007836
PCT Pub. Date: Jan. 17, 2013

(65) Prior Publication Data
US 2014/0167709 A1    Jun. 19, 2014

(30) Foreign Application Priority Data

Jul. 14, 2011  (DE) .......................... 10 2011 107 737

(51) Int. Cl.
*H02M 5/297*  (2006.01)
*H02M 5/22*  (2006.01)
(Continued)

(52) U.S. Cl.
CPC ................ *H02M 5/22* (2013.01); *H02M 5/293* (2013.01); *H02M 2007/4835* (2013.01)

(58) Field of Classification Search
CPC ....... H02M 5/27; H02M 5/271; H02M 5/275; H02M 5/293; H02M 2005/2932; H02M 5/297

USPC .................... 363/65, 157, 159, 163, 164, 165
See application file for complete search history.

(56) References Cited

U.S. PATENT DOCUMENTS 3,999,112 A * 12/1976 Gyugyi ................. H02M 5/271
                                                          363/10
8,890,465 B2 * 11/2014 Marquardt et al. ........... 318/800
(Continued)

FOREIGN PATENT DOCUMENTS

CN         102084583 A    6/2011
DE         101 03 031 A1   7/2002
(Continued)

OTHER PUBLICATIONS

M.Glinka et al.; "A New AC/ AC-Multilevel Converter Family Applied to a Single-Phase Converter"; pp. 16-23; 978-0-7803-7885-8; DOI No. 10.1109/peds.2003.1282669; XP010694784; 2003; DE; Nov. 17, 2003.
(Continued)

*Primary Examiner* — Gary L Laxton
(74) *Attorney, Agent, or Firm* — Henry M. Feiereisen LLC

(57) ABSTRACT

In a method for controlling a cycloconverter having six converter branches connected in series, in which converter branches electrical energy stores are provided, the energy transfer from a first three-line network into a second three-line network or vice versa is controlled according to energy demand criteria, energy supply criteria, and/or reactive power criteria for converter operation control. The amount of electrical energy stored in each converter branch or an electrical variable that characterizes the amount of electrical energy is controlled to a predetermined setpoint range for energy converter control.

15 Claims, 6 Drawing Sheets

(51) Int. Cl.
*H02M 5/293* (2006.01)
*H02M 7/483* (2007.01)

(56) References Cited

U.S. PATENT DOCUMENTS

| | | | | |
|---|---|---|---|---|
| 9,190,921 | B2 * | 11/2015 | Mertens | ................ H02M 5/293 |
| 2004/0160790 | A1 | 8/2004 | Diallo et al. | |
| 2011/0198936 | A1 * | 8/2011 | Graovac | ................ H02M 7/79 |
| | | | | 307/82 |
| 2011/0254494 | A1 | 10/2011 | Briane et al. | |

FOREIGN PATENT DOCUMENTS

| | | |
|---|---|---|
| DE | 10 2010 013 862 A1 | 10/2011 |
| GB | 2476497 | 6/2011 |
| RU | 2 375 804 | 12/2009 |
| SU | 1115164 | 4/1984 |
| WO | WO 2009/125012 | 10/2009 |
| WO | WO 2011/008567 | 1/2011 |

OTHER PUBLICATIONS

Hagiwara M et al.; ""PWM Control and Experiment of Modular Multilevel Converters""; Power Electronics Specialists Conference; pp. 154-161; ISBN:978-1-4244-1667-7; XP031299968; 2008; US; Jun. 15, 2008.

Jun Wen et al; ""Synthesis of Multilevel Converters Based on Single- and/or Three-Phase Converter Buildung Blocks""; IEEE Transactions on power electronics, IEEE Service Center, Pisataway; pp. 1247-1256; vol. 23; Nr. 3.; ISSN: 0885-8993; 2008; US; May 1, 2008.

L Baruschka et al.; ""A new 3-phase direct modular multilevel converter""; Proceedings of the 2011—14th European Conference on power electronics and applications; pp. 1-10; ISBN: 978-1-61-284167-0; XP:055085054; 2011; DE; Aug. 30, 2011.

\* cited by examiner

METHOD FOR CONTROLLING A CYCLOCONVERTER, ELECTRONIC CONTROL DEVICE THEREFOR, CYCLOCONVERTER, AND COMPUTER PROGRAM

CROSS-REFERENCES TO RELATED APPLICATIONS

This application is the U.S. National Stage of International Application No. PCT/EP2012/063878, filed Jul. 16, 2012, which designated the United States and has been published as International Publication No. WO 2013/007836 and which claims the priority of German Patent Application, Serial No. 10 2011 107 737.9, filed Jul. 14, 2011, pursuant to 35 U.S.C. 119(a)-(d).

BACKGROUND OF THE INVENTION

The invention relates to a method for controlling a cycloconverter which is designed to connect a first three-line network to a second three-line network. The cycloconverter has six converter branches connected in series with energy stores, wherein the converter can be controlled so that energy transfer from the first three-line network into the second three-line network or vice versa can occur in accordance with energy demand, energy supply and/or reactive power criteria. The invention further relates to an electronic control device for such a cycloconverter, a cycloconverter and also computer programs for controlling a cycloconverter.

In general the invention relates to the control of a cycloconverter in what is referred to as a hexverter configuration, i.e. in a configuration in which six converter branches are connected in series and the total of six lines of the first and of the second three-line network are each switched at the connection point between two converter branches. Such a configuration of a modular cycloconverter has already been proposed in the unpublished application DE 10 2010 013 862. Such a hexverter has the advantage that, by comparison with conventional matrix arrangements consisting of nine converter branches, the required module number and thus the hardware outlay can be reduced by a third, without this resulting in adverse effects on the performance. Compared to back-to back arrangements (M²LC topology) with 12 converter branches the number of modules can even be halved.

Some or all of the individual converter branches in such cases can have electrical energy stores, e.g. in the form of capacitors or rechargeable batteries (accumulators). A converter branch in such cases can be embodied from a single bridge module for example, as will be explained in greater detail below with reference to the exemplary embodiments. Series circuits of such bridge modules are also advantageous for forming a converter branch, since benefits will be obtained in respect of the regulation options, redundancy and the harmonic content of the output voltages and currents. The term "converter branch" therefore encompasses a single bridge module or a series circuit of a number of bridge modules.

The cycloconverter in the form of a hexverter explained here is novel, so that there is a desire for control of the hexverter which is as efficient as possible. Known methods of controlling cycloconverters are optimized to other circuit topologies.

SUMMARY OF THE INVENTION

The underlying object of the invention is therefore to specify a method for controlling a cycloconverter in the form of the hexverter explained here, which allows long-term operation of the cycloconverter which is as efficient as possible. In addition a suitable control device and a cycloconverter are to be specified as well as computer programs for carrying out the method.

The object is achieved by a method for controlling a cycloconverter which is configured for connecting a first three-line network to a second three-line network, wherein the cycloconverter has six converter branches connected in series, in which electrical energy stores are provided, wherein the method has a method for operational converter control with which the energy transfer from the first three-line network into the second three-line network or vice versa is controlled according to energy demand criteria, energy supply criteria and/or reactive power criteria, wherein the method comprises a method for energy content control, by means of which the amount of electrical energy stored in each converter branch or an electrical variable that characterizes the amount of electrical energy is regulated to a specified target range.

The invention has the advantage that the energy content in the individual converter branches is balanced over time and thereby smoothed. This allows an efficient long-term operation of the converter system. Thus both energy stores becoming empty and also overvoltages in already full energy stores are avoided. By avoiding overvoltages the components can be protected or be prevented from being destroyed. By avoiding these stores becoming empty a permanent preparedness for regulation of the individual bridge modules in each converter branch at any given time is guaranteed, so that the cycloconverter can provide the desired output voltages and currents at any given point in time.

The invention is suitable for linking large wind power systems with more than 10 MW to an energy supply network.

A further advantage of the invention is that no additional hardware elements are required for balancing the energy content in the energy stores. The method can be realized for example by expanding the control software of an existing converter control module.

The first and/or the second three-line network can be a direct current network for example. In accordance with an advantageous development of the invention the first three-line network is the feeding network and the second three-line network is the energy-consuming network, to which the energy consumers can be connected.

In accordance with an advantageous development of the invention the method for energy content regulation controls the reactive power generated by the cycloconverter in the first three-line network and/or in the second three-line network. It has been shown that a balancing of the energy content in the energy stores of the converter branches can be realized reliably in control technology terms by such a reactive power control. In accordance with an advantageous development the reactive power is controlled in this case such that the reactive power output to the first three-line network corresponds to the reactive power output to the second three-line network. The reactive power output by the cycloconverter to the first or the second three-line network is controlled in this case by controlling the bridge modules in the individual converter branches. Control of the reactive power to identical values in both three-line networks has the advantage that the energy displacement occurring in each case between two adjacent converter branches can be minimized.

In accordance with an advantageous development of the invention the method for energy content regulation controls a circulating current which flows through the entire series circuit of the six converter branches, and/or a star-point difference current which occurs between the star points of the first and the second three-line network. This has the advantage that the inventive balancing of the energy amount in the energy stores can also be realized in applications in which the reactive current control is not practicable in the three-line networks, because the reactive currents are predetermined as a result of external conditions or cannot just be changed. Advantageously in such cases the particular properties of the hexverter can be used, which allows a fundamental free adjustment of the circulating current and the star point displacement voltage independently of the respective energy transfer situation between the two three-line networks. The star point displacement voltage can in such cases be freely selected at least in that area in which this is permitted for the connected loads.

Thus for example a circulating current and/or a star-point displacement voltage can be injected as DC current or DC voltage. This is especially advantageous in applications in which a constant potential difference between the star points is permitted, for example when the cycloconverter is connected to a transformer or for generators not grounded as regards their windings and in other potential-free applications.

In accordance with an advantageous development of the invention the circulating current is set as a DC current and the star-point displacement voltage is set as a DC voltage. This has the advantage that the product of the required circulating current and required star-point displacement voltage is as small as possible in order to minimize the energy displacement occurring between the converter branches. By minimizing the maximum voltage required over the individual converter branches or the current required respectively in the individual converter branches, fewer or smaller components can be used, whereby the costs can be advantageously reduced.

It is likewise advantageous to inject a circulating current and/or a star-point displacement voltage as an AC current or an AC voltage. This is especially advantageous when the two star points may not exhibit any long-term potential difference from one another, such as for network coupling without a transformer for example.

In accordance with an advantageous development of the invention the cycloconverter is connected to one of the two three-line networks via a transformer. This makes it possible to set the star-point displacement voltage without generating a common-mode current. The use of star-point displacement voltage and circulating voltage as DC variables is made possible in this way, through which the hardware outlay for the cycloconverter is able to be minimized and a cost benefit is able to be obtained.

In accordance with an advantageous development of the Invention a circulating current and a star-point displacement voltage are injected which are in-phase or out-of-phase and in frequency with each other, wherein the frequency is different from the two frequencies of the first and the second three-line network. This has the advantage that specific elements of the cycloconverter, such as the size of any common mode filter which may be necessary for example, can be reduced by selecting a high frequency for example. This enables a cycloconverter to be constructed at lower cost.

In accordance with an advantageous development of the invention voltage components in the network frequency of the first three-line network will be overlaid onto the star-point displacement voltage already existing in accordance with the method described above. In accordance with a further advantageous development of the invention, voltage components in the network frequency of the second three-line network will be overlaid onto the star-point displacement voltage already existing in accordance with the method described above. Thus voltage components with just one frequency or with two frequencies can be overlaid, namely the respective network frequency of the first and the second three-line network. The voltage components in the star-point displacement voltage in the frequency of the first three-line network and the voltage components in the frequency of the second three-line network, together with the interworking described above between the constant or non-network-frequency components of the star-point displacement voltage described above and the circulating current, make the exchange of energy between any given branches of the cycloconverter possible. This is sensible for example if different losses occur in addition to the energy displacement into the individual branches depending on the operating point, which can be the case depending on the manufacturing tolerances of the components used or differing general conditions during operation of the cycloconverter. An especially flexible adaptation of the energy content regulation to practically any given applications is thus possible.

In accordance with an advantageous development of the invention current components in the network frequency of the first three-line network are overlaid onto the circulating current already existing in accordance with the method described above. In accordance with an advantageous development of the invention components in the network frequency of the second three-line network are overlaid onto the circulating current already existing in accordance with the method described above. The current components in the circulating current in the frequency of the first three-line network and the current components in the frequency of the second three-line network, together with the interworking of the constant or non-network-frequency components of the star-point displacement voltage and of the circulating current described above, make the exchange of energy between any given branches of the cycloconverter possible. This is sensible for example if different losses occur in addition to the energy displacement into the individual branches depending on the operating point, which can be the case depending on the tolerances of the components used or differing general conditions during operation of the cycloconverter. An especially flexible adaptation of the energy content regulation to practically any given applications is thus possible.

Combination of the said methods is also advantageous.

The object specified initially is further achieved by an electronic control device for a cycloconverter, which is configured for performing a method of the type previously described.

The object is further achieved by a cycloconverter with a control device of the type previously described.

In accordance with an advantageous development of the invention the energy store is embodied as a capacitor or includes a capacitor. In accordance with an advantageous development of the invention the energy store is embodied as a battery or includes a battery. The battery, in accordance with a further advantageous development, is embodied as a rechargeable battery. The use of the battery enables the energy storage capability of the cycloconverter to be further increased, so that energy can also be buffered over the longer term.

In accordance with an advantageous embodiment of the Invention the cycloconverter is a transformerless cycloconverter for connecting the first three-line network to the second three-line network by means of bridge modules having electronic semiconductor switches, wherein the direct converter has six bridge modules or series circuits thereof, with the following features:

a) a first bridge module or a first series circuit of bridge modules is connected on one side to a first line of the first power supply network and on the other side to a first line of the second power supply network,
b) a second bridge module or a second series circuit of bridge modules is connected on one side to a second line of the first power supply network and on the other side to the first line of the second power supply network,
c) a third bridge module or a third series circuit of bridge modules is connected on one side to the second line of the first power supply network and on the other side to a second line of the second power supply network,
d) a fourth bridge module or a fourth series circuit of bridge modules is connected on one side to a third line of the first power supply network and on the other side to the second line of the second power supply network,
e) a fifth bridge module or a fifth series circuit of bridge modules is connected on one side to the third line of the first power supply network and on the other side to a third line of the second power supply network,
f) a sixth bridge module or a sixth series circuit of bridge modules is connected on one side to the first line of the first power supply network and on the other side to the third line of the second power supply network.

The cycloconverter, in an elegant manner and with low outlay in circuit technology, makes possible a simple and low-cost coupling and direct conversion between three three-line networks. A three-line network is to be understood here as any electrical connection of an electrical or electronic component via the three lines carrying supply energy, such as an electric motor drive, an energy supply network or an electrical generator for example. With the inventive cycloconverter the coupling of an electric motor drive to an energy supply network or of an electrical generator to an energy supply network is possible. The invention naturally also includes the coupling of two energy supply networks to one another.

With the topology explained here, a simpler and lower-cost structure can be obtained compared to prior-art cycloconverters. In said prior art, as explained, an arrangement of at least nine bridge modules or series arrangements thereof are needed. Through the topology proposed here of six bridge modules or series circuits of bridge modules, a reduction of the hardware outlay by at least one third with the same functionality is thus possible. With the use of a correspondingly large number of bridge modules in the series circuit the requirement for corresponding input and output filters is thus removed entirely. Application fields of the proposed topology are for example large speed-regulated drives, generators with variable speed and also the area of network coupling with integrated reactive power compensation.

The cycloconverter can have a series circuit of a plurality of bridge modules. The use of a series circuit of a plurality of bridge modules allows an increased flexibility in respect of the setting of the output voltage. In addition the fail-safe performance is enhanced, since a plurality of bridge modules contains a certain redundancy. Thus for example with an internal defect of a bridge module of the series circuit, e.g. a defect at an intermediate circuit capacitor or a battery, this bridge module can be bridged via the full-bridge circuit. The voltage failure caused by this can be compensated for by the remaining bridge modules of the series circuit, in that, by appropriate control of the electronic semiconductor switches of the bridge modules, an increased output voltage is set per bridge module in each case.

In an advantageous version of the invention identical bridge DC voltages are used in all bridge modules. With a correspondingly high number of bridge modules a fine adjustment of the resulting output voltage of a series circuit of such bridge modules is possible.

In an advantageous development of the invention bridge modules with different bridge DC voltages can be used. This enables bridge modules with different rated voltages to be used. The term rated voltage describes the maximum DC voltage allowed by the components. This allows different voltage ranges in relation to the output voltages of the individual bridge modules that can be set. This produces an improved flexibility in respect of the discrete adjustable voltage values of a series circuit of bridge modules. By comparison with the use of identical direct bridge voltages in all bridge modules, a fine adjustment of the resulting output voltage of the series circuit of bridge modules is thus already possible with a smaller number of bridge modules.

This advantageously enables the output voltage of the series circuit to be combined in the manner of a successively approximating digital/analog converter by combination of different voltage values of different bridge modules. For example the rated voltages can be increased from bridge module to bridge module in each case by the factor 2, which allows an adjustability of the output voltage of the series circuit in accordance with the binary system. In accordance with another example a number of bridge modules are used in each case in which the bridge DC voltages or rated voltages are different from one another, however with smaller differences. If for example 600 V and 800 V occur in a series circuit as the bridge DC voltages used, then the smallest voltage stage that can be set reduces to 800 V-600 V=200 V.

In accordance with an advantageous development of the invention, at least one bridge module has the following features:
a) The bridge module has a first and a second terminal for connection to a line of the energy supply network or a terminal of a further bridge module,
b) The bridge module has four electronic semiconductor switches in a full-bridge circuit,
c) The first and the second terminal of the bridge module is connected to connection points of the full bridge circuit lying opposite one another,
d) The bridge module has a capacitor which is connected to the further connection points of the full bridge circuit lying opposite one another.

The full bridge circuit in such cases variably allows a plurality of adjustable switching states, e.g. the switching of a direct connection between the first and the second terminal of the bridging module (bridging over the bridging module) or a charging or discharging of the capacitor with the desired polarity in each case able to be set via the semiconductor switch. By corresponding activation of the semiconductor circuit via a control device, which outputs pulse-width-modulated control signals for example, a relatively finally-adjusted charging and discharging of the capacitor is possible.

In accordance with an advantageous development of the invention at least one bridge module has the following features:
a) The bridge module has a battery,
b) The bridge module has a controllable DC converter of which one connection side is connected in parallel to the capacitor and to the other connection side of which the battery is connected.

In an elegant manner and with little outlay in circuit technology this allows a battery to be incorporated into the cycloconverter. With the battery or a plurality of batteries, when a plurality of bridge modules are used, an uninterruptible power supply can be integrated with little effort. When the cycloconverter is used on a power supply network, this is a way for example of providing an instant reserve for network stabilization. By means of the battery of the bridge modules a buffering of the energy supply depending on the design of the batteries is possible even for a longer period of time, e.g. during periods of low energy generation of the wind energy park. In a comparable way a solar energy supply device can be advantageously coupled with the said device to a three-phase network. Advantageously the energy can be buffered using the batteries for periods of low sunlight or during the night.

The battery is advantageously embodied as a rechargeable battery, e.g. as a nickel metal hydride accumulator, lead accumulator or lithium polymer accumulator. Naturally other accumulator technologies can also be used.

This type of bridge module design makes it possible to keep the bridge DC voltage generated with the aid of the bridge module constant independently of the battery voltage, and to do this by corresponding control of the DC converter. Even when the battery voltage is falling, this allows a constant output voltage to be maintained. In this context a bridge module is to be understood as any spatial and constructional arrangement of the said elements, regardless of whether the elements are for example combined in a housing or are disposed distributed. For example the battery can be disposed mechanically separated from the other elements of the bridge module. In an advantageous development of the invention the battery is integrated mechanically into the bridge module.

A further advantage is that the ripple content of the power demand or of the current flowing through the bridge module can essentially be decoupled from the battery. An essentially constant flow of current through the battery is possible, i.e. the higher-frequency components in the energy supply network can be kept away from the battery. This significantly increases the potential lifetime of the batteries.

Advantageously a series circuit of bridge modules can be used. This enables direct series switching of a large number of batteries to be avoided. An integration of a plurality of batteries is then possible via a plurality of the bridge modules, each of which features a battery. This avoids circuit technology outlay for balancing or charging/discharging circuits for the batteries and thus reduces the overall complexity of the circuit.

Advantageously the battery voltage is selected to take account of the bridge DC voltage or the rated voltage of the respective bridge module. This enables situations in which the DC converter has to perform major conversions to be avoided and efficiency is optimized. In the event of different rated voltages in the bridge modules of a converter the voltages of the batteries used then also differ from one another.

A further advantage is that the bridge module can be switched off over the full bridge circuit. Thus with a defective power semiconductor, a bridge module can be switched off in a series circuit of bridge modules. Despite failure of a bridge module, the desired output voltage of the series circuit can also be kept constant over the remaining bridge module.

A further advantage of the invention is that a bridge module of which the battery is defective can remain in operation. In the meantime, although the module with the defective battery cannot deliver any energy, it can however be used to increase the voltage via the series circuit of bridge modules during part of the network period, and thus helps to reduce the overdimensioning of the rated voltages of the individual bridge elements necessary for a fail-safe operation of the converter.

The two said measures especially enable fail-safe, uninterruptible power supplies or converter systems to be created.

A further advantage of the invention is that different voltage levels of the batteries which occur depending on the charging state can be compensated for by the DC converter. This enables the bridge module to generate a desired constant output voltage. Thus, even when the bridge modules are used in a series circuit, e.g. In a converter, a constant voltage can be maintained on the three-line network. A further advantage is that the overdimensioning in relation to the number of modules or of the battery voltage provided in known converters is no longer necessary since, if a bridge module or the battery of the bridge module falls, the missing voltage can be compensated for by a corresponding raising of the output voltages and if necessary the bridge DC voltages of the other bridge modules.

With a corresponding layout of the DC converter basically, even with a smaller number of bridge modules or batteries, a comparable device to uninterruptible power supplies from the prior art can be constructed. This allows especially low-cost uninterruptible power supplies to be realized.

Depending on safety and reliability requirements, in an advantageous embodiment, the series circuit of the bridge modules can be designed overdimensioned right from the start, i.e. a larger number of bridge modules or batteries can be provided than would be necessary for achieving the desired output voltage per se. Thus redundant bridge modules are provided. The desired output voltage can be produced by downwards conversion of the bridge DC voltages of the individual bridge modules via their bridge circuits. Since each individual module must thus provide less energy, on the one hand this preserves the batteries. In addition, even in the event of a failure of a larger number of bridge modules, the desired output voltage can be maintained. This enables the fail-safe operation of the entire device to be increased further, for example compared to pure series circuits of batteries.

In accordance with an advantageous development of the invention the DC converter is configured to provide an output voltage at the capacitor which, depending on design and control of the DC converter, is able to be set higher, lower or equal to the voltage of the battery. The use of such a controllable DC converter allows a high flexibility in the use of the bridge module or of a plurality of bridge modules and the control of the output voltage. The DC converter can be designed as a pure upwards converter (output voltage higher than or equal to the battery voltage), pure downwards converter (output voltage lower than or equal to the battery voltage) or as a combined upward/downwards converter. The use of an upwards converter is advantageous since on the one hand fewer components are needed for this than for a combined upwards/downwards converter and on the other hand a lower battery voltage is needed, which reduces the potential need for balancing options.

In accordance with an advantageous development of the invention the DC converter is a bidirectional DC converter. This enables the energy for the bridge DC voltage not only to be provided variably in the one direction at the output of the DC converter connected to the capacitor, but additionally also enables the battery to be charged with a voltage derived from the side of the DC converter connected to the capacitor with a charge voltage suitable for the respective battery state. In addition a defined discharge of the battery is also able to be controlled via the bidirectional DC converter, e.g. for the purposes of forming the battery.

In accordance with an advantageous development of the invention the DC converter has a half bridge with two electronic semiconductor switches. Advantageously semiconductor switches of the same type as for the full bridge circuit can be used. This allows a simple and low-cost layout of the DC converter from a few components and thus the low-cost layout of the bridge module as a whole.

In an advantageous development of the invention the electronic semiconductor switches are provided in the form of a three-phase IGBT module. An IGBT (Insulated Gate Bipolar Transistor) module refers to a four-layer semiconductor component which is controlled by means of the gate. IGBTs are a development of power MOSFETs. On the output side IGBTs have P-N semiconductor junctions. Thus an IGBT is a type of combination of a field effect semiconductor component and a bipolar semiconductor component. IGBTs are frequently used in energy supply technology in the form of modules with three half bridges, i.e. six IGBT semiconductor switches. Such modules are therefore readily available at low cost. The invention demonstrates an elegant way of using the six semiconductor switches or three half bridges present in a three-phase IGBT module efficiently for the construction of a bridge module.

In accordance with an advantageous development of the invention at least one choke is connected in series with a bridge module or a series circuit of bridge modules. This choke has the effect, through its energy storage characteristic, of smoothing the passage of current through the bridge module or through the series circuit of bridge modules.

In accordance with an advantageous development of the invention a control unit is configured in a series circuit of bridge modules to switch off a bridge module recognized as defective. The switching off can be done by bridging the terminals of the bridge module via its semiconductor switch. In accordance with an advantageous development of the invention a control unit is configured to switch off a battery of a bridge module recognized as defective. The switching off can be done for example by the semiconductor switches of the DC converter. The control unit can be a control unit assigned to the bridge module, a higher-ranking control unit for a plurality of bridge modules or a central control unit for the entire cycloconverter.

The object is further achieved by a computer program with program code means which are configured for carrying out the method of the previously described type when the computer program is executed on a computer. The computer can for example be a microprocessor or microcontroller of the said electronic control device for a cycloconverter, or a control computer of a converter system.

The object is further achieved by a computer program with program coding means which are stored on a machine-readable carrier, configured for carrying out the method of the previously described type when the computer program is executed on a computer.

BRIEF DESCRIPTION OF THE DRAWING

The invention will be described below on the basis of exemplary embodiments using drawings. In the figures.

DETAILED DESCRIPTION OF PREFERRED EMBODIMENTS

Figure 1:
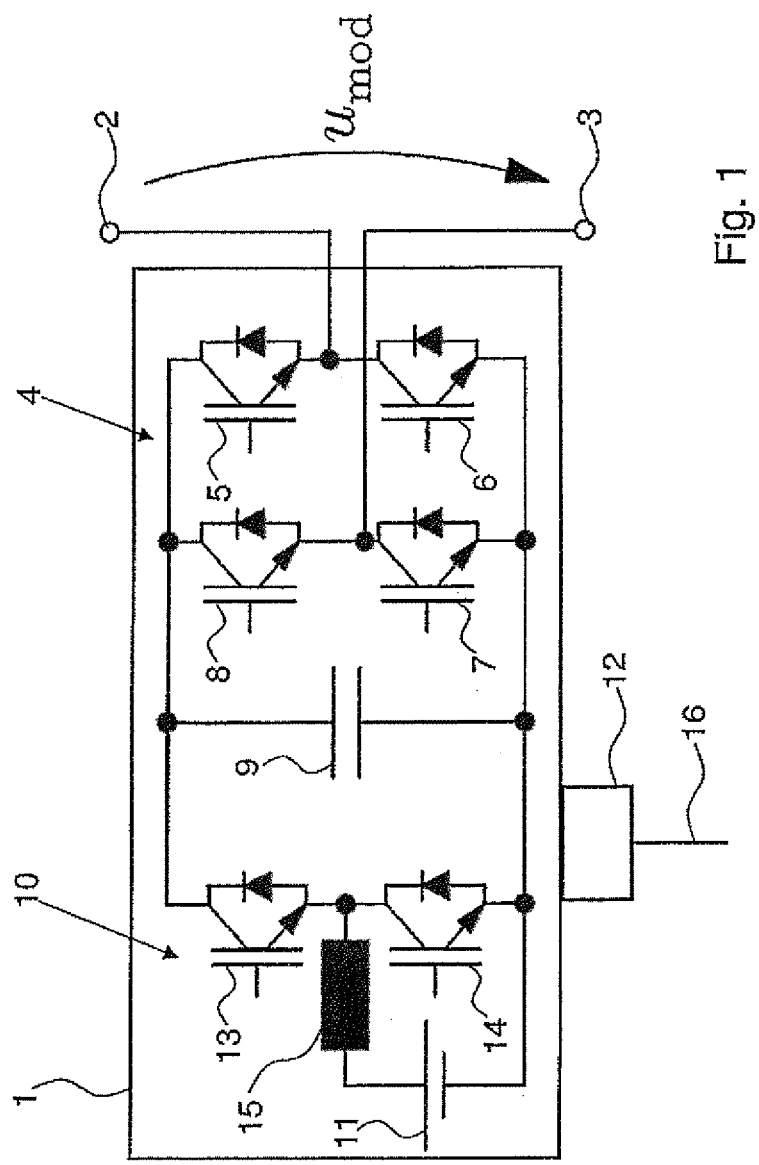
FIG. 1 shows a bridge module in a first embodiment.

In the figures the same reference characters are used for elements corresponding to one another.

The hexverter can thus be constructed with bridge modules without a battery and also with bridge modules with a battery, wherein mixed equipping is also possible. First of all a bridge module with battery is described on the basis of FIG. 1. The descriptions basically also apply to the bridge module without battery described on the basis of FIG. 2, wherein the buffering function of the battery is not shown in this figure.

FIG. 1 shows a bridge module 1, which is suitable as a device for incorporating at least one battery into an energy supply network. The bridge module 1 has as its external terminals a first terminal 2 and a second terminal 3. The terminals 2, 3 are the external connections of the bridge module to an energy supply network, to further bridge modules of a converter branch or to other components. The bridge module 1 has a full bridge circuit 4 with four electronic semiconductor switches 5, 6, 7, 8. Between two opposite connection points 16, 17 of the full bridge circuit 4 a bipolar capacitor 9 is connected. The other two opposite connection points 18, 19 of the full bridge circuit 4 are connected to the external terminals 2, 3. The connection points 16, 17 are connected to a controllable, bidirectional DC converter 10 which is embodied as a combined upwards/downwards converter. The DC converter is connected in parallel to the capacitor 9. On the opposite connection side of the DC converter 10 a battery 11 connected to the DC converter 10 is provided. The bridge module 1 also has a local control unit 12, e.g. in the form of a microprocessor or a logic circuit. The local control unit 12 is connected to the control terminals of the semiconductor switches 5, 6, 7, 8 as well as to a control input of the DC converter 10. The local control unit executes a control program with which the function of the DC converter 10 and also the switching states of the semiconductor switches 5, 6, 7, 8 are controlled.

The semiconductor switches 5, 6, 7, 8 of the full bridges 4 are each embodied as an IGBT for example. Furthermore the DC converter 10 has two other electronic semiconductor switches 13, 14 which are embodied as IGBTs for example. The gate terminals of the semiconductor switches 13, 14, like the gate terminals of the semiconductor switches 5, 6, 7, 8, are connected to the local control unit 12. The local control unit 12 in this case carries out control of the DC converter 10 by corresponding activation of the semiconductor switches 13, 14. The semiconductor switches 13, 14 are disposed in the half bridge circuit. Here the collector terminal of the semiconductor switch 13 is connected to the connecting point 16 of the full bridge circuit 4. The emitter terminal of the semiconductor switch 13 is connected to the collector terminal of the semiconductor switch 14 and also to a choke 15. The choke 15 is connected to a terminal of the battery 11, e.g. with the plus pole. A second terminal, e.g. the minus pole of the battery 11, is connected to the emitter terminal of the semiconductor switch 14 and thus to the connection point 17 of the full bridge circuit 4.

The use of the semiconductor switches 13, 14 as well as the choke 15 allows a simple and low-cost construction of a bidirectional, controllable DC converter which is thus embodied as an upwards converter. In addition a three-phase IGBT module can be used which already has six IGBTs which are each switched in pairs in the half bridge circuit. A first half bridge of the IGBT module can be used here for the arrangement of the semiconductor switches 5, 6, a second half bridge for the semiconductor switches 7, 8 and the third half bridge for the semiconductor switches 13, 14.

The local control unit 12 is connected via a line 16 to the central electronic control device 40, the construction and function of which will be explained later. The line 16 can be a data bus for example, e.g. a serial data bus. Via the line 16 the local control unit 12 receives setpoint values on the basis of which it controls the full bridge circuit 4 and the DC converter 10. Via the line 16 the local control unit 12 also transfers characteristic values to the central electronic control device 40, e.g. the charge state of the capacitor 9 and/or of the battery 11.

Figure 2:
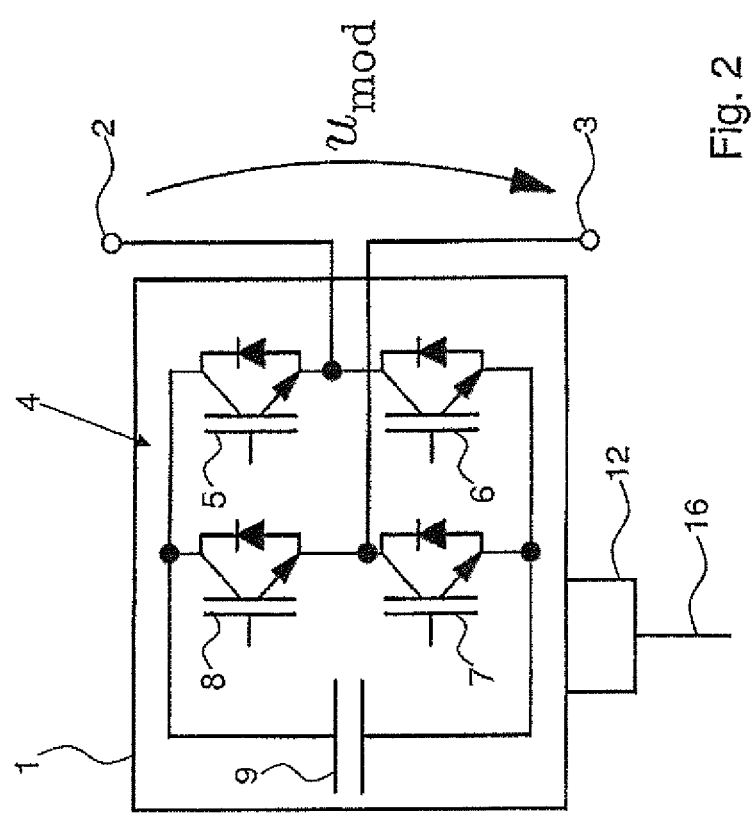
FIG. 2 shows a bridge module in a second embodiment.

FIG. 2 shows a further embodiment of a bridge module 1. The bridge module 1 in accordance with FIG. 3 is constructed in a comparable manner to the bridge module 1 in accordance with FIG. 2, but without the DC converter 10 and the battery 11 however.

Figure 3:
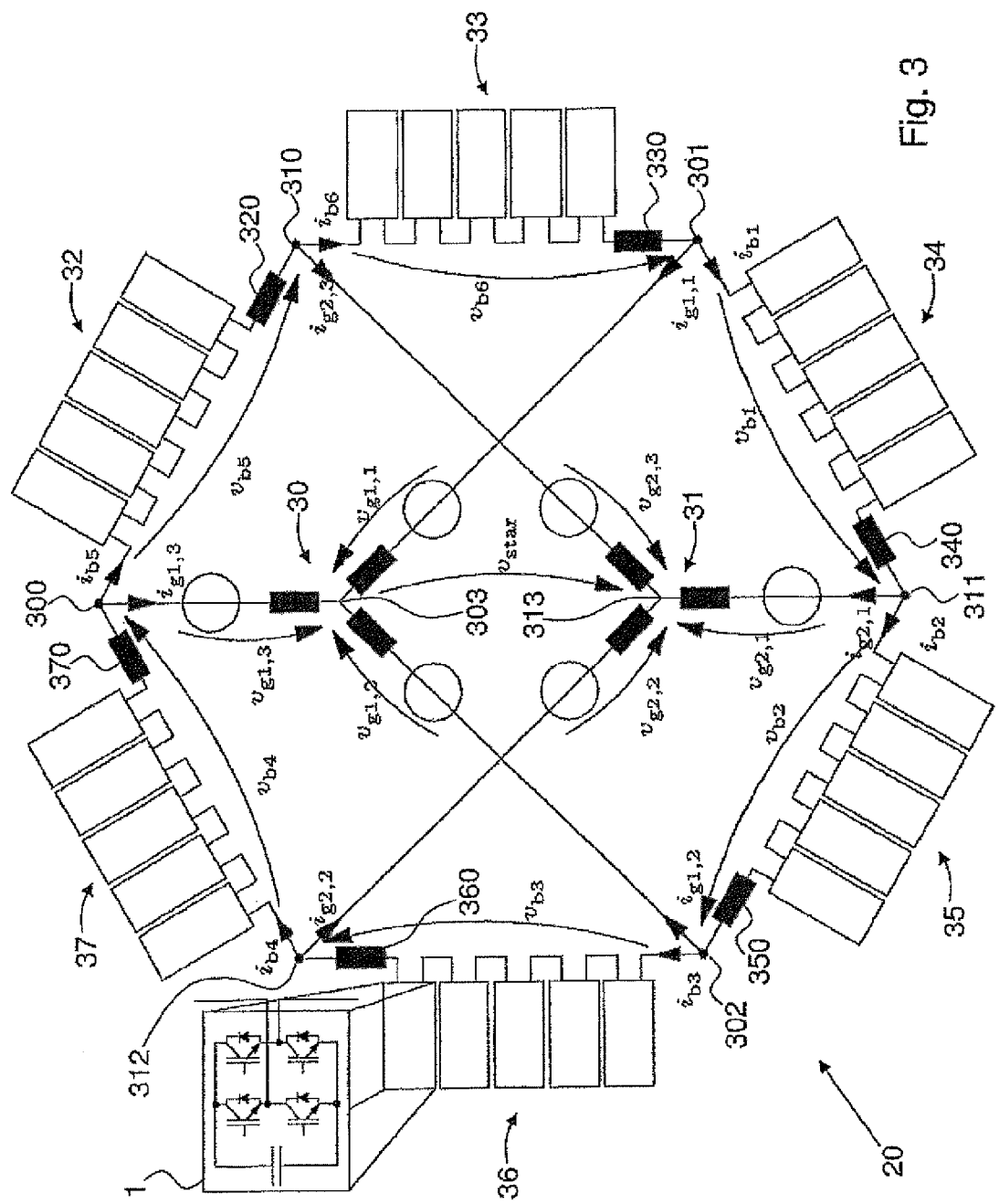
FIG. 3 shows a cycloconverter in the form of a hexverter.

FIG. 3 shows a cycloconverter 20, with which a first three-line network 30, e.g. an energy supply network embodied as an alternating current network, is connected to a second three-line network 31. The second three-line network 31 can likewise be embodied as an alternating current network. Series circuits 32, 33, 34, 35, 36, 37 of bridge module 1 are used for connection in each case, wherein the bridge modules can optionally be embodied with or without battery and DC converter. Bridge modules in accordance with FIGS. 1 and 2 can be used here, also mixtures thereof. Arranged in series to the respective series circuit 32, 33, 34, 35, 36, 37 is a choke 320, 330, 340, 350, 360, 370 in each case. The device is constructed as follows:

A first series circuit 32 of bridge modules 1 is connected at a connection point 300 on one side to a first line of the first three-line network 30 and at a connection point 310 on the other side to a first line of the second three-line network 31. A second series circuit 33 of bridge modules 1 is connected at a connection point 301 on one side to a second line of the first three-line network 30 and at the connection point 310 on the other side to the first line of the second three-line network 31. A third series circuit 34 of bridge modules 1 is connected at the connection point 301 on one side to the second line of the first three-line network 30 and at a connection point 311 on the other side to a second line of the second three-line network 31. A fourth series circuit 35 of bridge modules 1 is connected at a connection point 302 on one side to a third line of the first three-line network 30 and at the connection point 311 on the other side to the second line of the second three-line network 31. A fifth series circuit 36 of bridge modules 1 is connected at the connection point 302 on the one side to the third line of the first three-line network 30 and at a connection point 312 on the other side to a third line of the second three-line network 31. A sixth series circuit 37 of bridge modules 1 is connected at the connection point 300 on the one side to the first line of the first three-line network 30 and at the connection point 312 on the other side to the third line of the second three-line network 31. Each of the series circuits 32, 33, 34, 35, 36, 37 forms a converter branch.

FIG. 3 also shows a star point 303 of the first three-line network 30 and a star point 313 of the second three-line network 31.

The topology shown in FIG. 3 allows, with corresponding control of battery-equipped bridge modules 1, the realization of an uninterruptible power supply in the energy supply network. In addition, via the bridge module 1, there can be reactive power compensation as well as compensation for fluctuations in the energy demand or, when used for connection of a generator to the power supply network, compensation for fluctuations in the energy provided. For coordination of the control of the plurality of bridge modules 1 the central electronic control device 40 is provided, which is connected with individual local control units 12 of the bridge module 1 via data communication. The central electronic control device 40 controls the bridge AC voltages of the individual bridge modules as well as the output voltages output by the individual bridge modules.

FIG. 3 further shows the voltages and currents occurring in the two three-line networks 30, 31 as well as the cycloconverter 20. For the observations made below these should be defined as follows.

$$v_{g1.1}(t) = \hat{v}_{g1}\cos(\omega_1 t)$$

$$v_{g1.2}(t) = \hat{v}_{g1}\cos\left(\omega_1 t - \frac{2\pi}{3}\right)$$

$$v_{g1.3}(t) = \hat{v}_{g1}\cos\left(\omega_1 t - \frac{4\pi}{3}\right)$$

$$v_{g2.1}(t) = \hat{v}_{g1}\cos(\omega_2 t + \psi)$$

$$v_{g2.2}(t) = \hat{v}_{g2}\cos\left(\omega_2 t + \psi - \frac{2\pi}{3}\right)$$

$$v_{g2.3}(t) = \hat{v}_{g2}\cos\left(\omega_2 t + \psi - \frac{4\pi}{3}\right)$$

$$i_{g1.1}(t) = \hat{i}_{g1}\cos(\omega_1 t - \varphi_1)$$

$$i_{g1.2}(t) = \hat{i}_{g1}\cos\left(\omega_1 t - \varphi_1 - \frac{2\pi}{3}\right)$$

$$i_{g1.3}(t) = \hat{i}_{g1}\cos\left(\omega_1 t - \varphi_1 - \frac{4\pi}{3}\right)$$

$$i_{g2.1}(t) = \hat{i}_{g2}\cos(\omega_2 t - \varphi_2 + \psi)$$

$$i_{g2.2}(t) = \hat{i}_{g2}\cos\left(\omega_2 t - \varphi_2 + \psi - \frac{2\pi}{3}\right)$$

$$i_{g2.3}(t) = \hat{i}_{g2}\cos\left(\omega_2 t - \varphi_2 + \psi - \frac{4\pi}{3}\right)$$

In these equations the values provided with circumflexes refer to the respective amplitudes. $\omega_1$ is the circuit frequency of the first three-line network 30, $\omega_2$ is the circuit frequency of the second three-line network 31. $\psi$ a describes the phase displacement of the voltages of the second three-line network in relation to the first three-line network. $\varphi_1$ describes the phase displacement between the current sum voltages in the first three-line network, $\varphi_2$ describes the phase displacement between the currents and voltages in the second three-line network.

The overall energy content of the cycloconverter 20 is able to be regulated for example by selecting the effective power $-P_{g1}$ output from the first three-line network 30 into the cycloconverter 20, taking into account the effective power output $P_{g2}$ to the second three-line network 31. Ignoring the losses in the cycloconverter 20, the following applies for the stationary case $$P_{g1} - P_{g2} = 0$$

For further consideration a distinction is made between two cases: Operation with greatly unequal frequencies in the two three-line networks and operation with essentially the same frequencies. The following observations further relate to the direct components $\overline{P}_{zi}$ of the powers in the converter branches 32, 33, 34, 35, 36, 37 which are distinguished below by indices i=1 to 6. It makes sense to consider the direct components since these are important for stable operation of the converter.

The following applies for the branch voltages $v_{bi}$ in the converter branches i=1 to 6:

$$v_{b1} = v_{g1.1} - v_{g2.1} + v_{star} \quad (1)$$

$$v_{b2} = v_{g2.1} - v_{g1.2} - v_{star} \quad (2)$$

$$v_{b3} = v_{g1,2} - v_{g2,2} + v_{star} \quad (3)$$

$$v_{b4} = v_{g2,2} - v_{g1,3} - v_{star} \quad (4)$$

$$v_{b5} = v_{g1,3} - v_{g2,3} + v_{star} \quad (5)$$

$$v_{b6} = v_{g2,3} - v_{g1,1} - v_{star} \quad (6)$$

The star point displacement voltage $v_{star}$ is also considered, which is defined as the difference between the potentials of the star points 303, 313 of the first and of the second three-line network 30, 31. The star point displacement voltage $v_{star}$ is, provided this is allowable for the load, freely selectable. In addition a circulating current $$i_{cir} = \frac{1}{6}\sum_{i=1}^{6} i_{b1}$$

can be regulated independently of the currents in the three-line networks, i.e. the sums of all currents $i_{b1}, i_{b2} \ldots i_{b6}$ in the converter branches 32, 33, 34, 35, 36, 37. With the star point displacement voltage and the circulating current there are two freely-selectable variables available for energy regulation.

First of all operation with different frequencies will be considered. Depending on the operating point and the precondition of two symmetrical three-line networks, an energy displacement occurs between two adjacent branches of the cycloconverter 20 in each case. The energy displacement is able to be expressed in the form of a displacement power $P_s$, which is independent of the reactive powers occurring in the three-line networks 30, 31:

$$P_s = \frac{\sqrt{3}}{18(Q_2 - Q_1)} \quad (7)$$

The average value of the individual branch powers $\overline{P_{zt}}$ must be equal to 0 for a permanent, stable operation. The following equations therefore apply:

$$\overline{P}_{z1} = -1/6(P_1 + P_1(z))) + P_1 s \quad (8)$$

$$\overline{P}_{z2} = -1/6(P_1 + P_2) - P_s \quad (9)$$

$$\overline{P}_{z3} = -1/6(P_1 + P_1(2))) + P_1 s \quad (10)$$

$$\overline{P}_{z4} = -1/6(P_1 + P_1(2)) - P_1 s \quad (11)$$

$$\overline{P}_{z1} = -1/6(P_1 + P_1(2))) + P_1 s \quad (12)$$

$$\overline{P}_{z6} = -1/6(P_1 + P_1(2))) - P_1 s \quad (13)$$

Taking into account the stationary condition $P_1 + P_2 + 0$, the displacement power $P_s$ remains as an interference variable. To compensate for it, the reactive power output to the first three-line network 30 can be set such that it corresponds to the reactive power output to the second three-line network 31. This is explained below in more detail with reference to FIG. 4.

Figure 4:
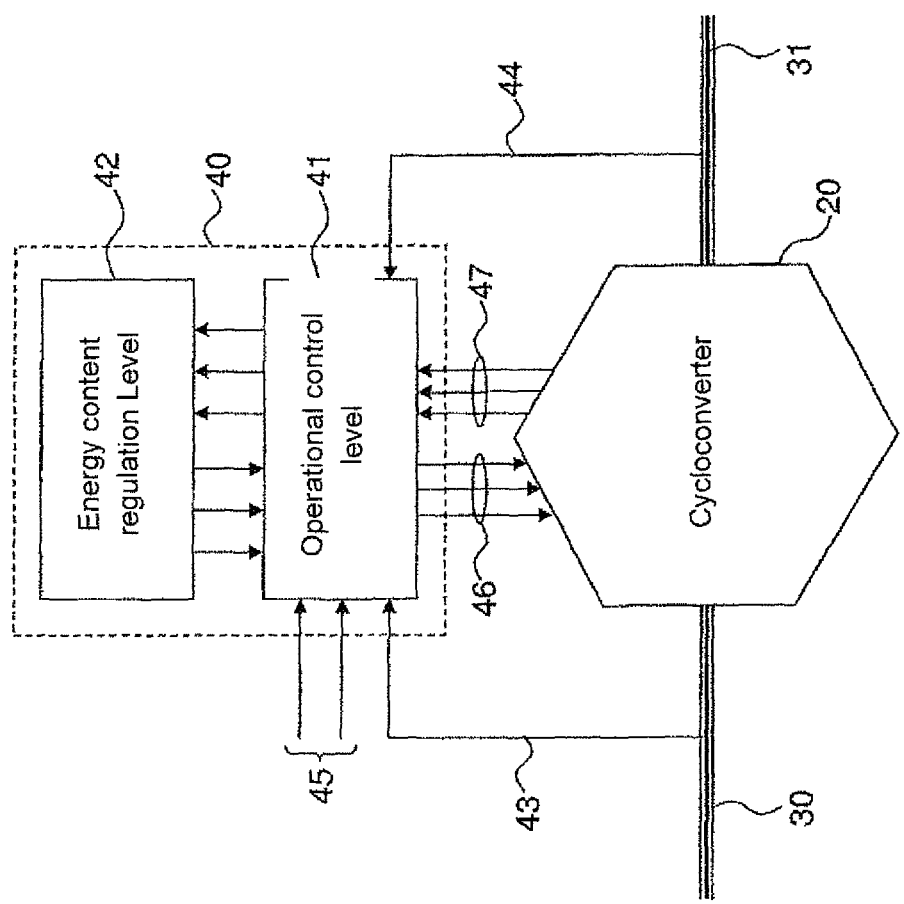
FIG. 4 shows the cycloconverter in accordance with FIG. 3 with a control device and FIGS. 5 and 6 show a schematic diagram of an energy content regulator

FIG. 4 shows schematically the first three-line network 30, the cycloconverter 20 and the second three-line network 31. A central electronic control device 40 for controlling the cycloconverter 20 is also shown. The electronic control device 40 can be equipped with a microprocessor, on which a control program in the form of a computer program is executed. The control program can have an operational control level 41 which is used to control the basic functions of the cycloconverter such as the energy transfer from the first three-line network into the second three-line network for example, or conversely in accordance with externally predetermined energy demand, energy supply and/or reactive power criteria. For this the operational control level 41 is supplied with corresponding control date 45 from outside, such as for example the transferred effective power, the reactive power to be set and the output voltage of the cycloconverter 20. The control device 40 also has input circuits via which the control device 40 is supplied with measurement data via a measurement branch 43 from the first three-line network 30 and measurement data via a second measurement branch 44 from the second three-line network 31. The control device 40 can determine the respective reactive power in the three-line networks 30, 31 via this. The control device 40 has an input circuit via which feedback signals 47 are read in from the individual local control units 12 of the bridge module 1 of the converter branches 32, 33, 34, 35, 36, 37 into the control device 40. The control device 40 has an output circuit via which output signals 46 are output to the individual local control units 12 of the bridge modules 1 of the converter branches 32, 33, 34, 35, 36, 37. The actual basic function of the cycloconverter is controlled in this way.

The operating program also has a level 42 for energy content regulation with which a method of energy content regulation is carried out, with which the respective amount of electrical energy stored in each converter branch or an electrical variable identifying the amount of electrical energy is regulated to a predetermined set point range.

The setpoint range can for example be a specific percentage range of the maximum amount of energy able to be stored in the respective energy store 9, 11 or a setpoint voltage range, related to the maximum permissible voltage value of the energy store 9, 11 or other components. Thus it can be predetermined for example that the amount of energy stored in an energy store always lies in the range of between 70% and 100% of the maximum amount of energy to be stored.

The level 42 for energy content regulation receives input data from the operational control level 41, processes this data and sends control data back to the operational control level 41, as shown by the arrows between the operational control level 41 and the level 42 for energy regulation. In the case of the previously mentioned adaptation of the reactive power, the level for energy regulation 42 receives the current reactive power $Q_1$ output to the first three-line network 30 and returns as an output variable a predetermined value for the reactive power $Q_2$ to be output to the second three-line network 31, e.g. $Q_2 = Q_1$. In this case a regulator with an especially simple structure is provided, namely a P regulator with gain 1. More complex regulator types can also be used as required, such as e.g. PI regulators or PID regulators, which take into account the actual energy content of the individual bridge modules.

The operational control level 41 implements the requirement for setting the reactive power $Q_2$ into corresponding control information for the individual local control units 12 of the bridge modules 1.

A further embodiment of the energy content regulation can be realized from the level 42, e.g. by compensation of the displacement power by injecting specific circulating currents and star point displacement voltages. By the injection of both circulating current and star point displacement voltage an additional term for the branch power is produced in each case at the individual converter branches. If it is possible for the application to allow a constant potential difference between the two star points 303, 313, e.g. with connection to a transformer, then it is advantageous to inject equal values $I_{cir}, V_{star}$ as circulating current $I_{cir}$ and star-point displacement voltage $V_{star}$. The displacement power is then determined as follows $$P_s = \frac{\sqrt{3}}{18}(Q_2 - Q_1) + V_{star} \cdot I_{cir} \quad (14)$$

Through the level 42 for energy content regulation the product $V_{star} \cdot I_{cir}$ is then set to $$\frac{\sqrt{3}}{18}(Q_1 - Q_2).$$

When the two star points 303, 313 are not to have any permanent potential difference harmonic alternating variables of identical frequency in accordance with $$V_{star}(t) = \hat{V}_{star} \cdot \cos(\omega_s t) \text{ and}$$

$$i_{cir}(t) = \hat{i}_{cir} \cdot \cos(\omega_s t)$$

can also be used for circulating current and star point displacement voltage, which as a result of their phase equality (for identical leading signs of $\hat{V}_{star}$ and $\hat{i}_{cir}$) or out-of-phase behavior (with different leading signs $\hat{V}_{star}$ and $\hat{i}_{cir}$) produce the same effect. With the multipliers $\hat{V}_{star}$ and $\hat{i}_{cir}$ of the star point displacement voltage $v_{star}$ and of the circulating current $I_{cir}$, the following equation applies:

$$P_s = \frac{\sqrt{3}}{18}(Q_2 - Q_1) + \frac{\hat{v}_{star} \cdot \hat{i}_{cir}}{2}. \quad (15)$$

Accordingly the product of $\hat{V}_{star} \cdot \hat{i}_{cir}$ is to be set by the level 42 for energy content regulation to $$\frac{\sqrt{3}}{18}(Q_1 - Q_2).$$

In this case the frequency ($\omega_s$) used for $V_{star}$ and $i_{cir}$ can differ from the frequencies of the first and the second three-line network 30, 31.

Unsymmetries in the three-line networks 30, 31 and unequal losses in the individual bridge modules 1 can lead to imbalances in the energy content between the converter branches. To compensate for such imbalances it is proposed to also regulate the power supplied to the individual converter branches 32, 33, 34, 35, 36, 37. This can also be done by a suitable choice of the circulating current or the star point displacement voltage. In a first embodiment it is assumed that a DC voltage $V_{star}$ is injected as star-point displacement voltage. The currents flowing in the individual converter branches 32, 33, 34, 35, 36, 37 are overlaid with injected current components $\hat{i}_{cir,n,m}$:

$$i_{cir}(t) = I_{cir} + \hat{i}_{cir,1.1} \cdot \cos(\omega_1 t) + \hat{i}_{cir,1.2} \cdot \cos\left(\omega_1 t - \frac{2\pi}{3}\right) + \quad (16)$$

$$\hat{i}_{cir,2.1} \cdot \cos\left(\omega_2 t + \psi + \frac{\pi}{3}\right) + \hat{i}_{cir,2.2} \cdot \cos\left(\omega_2 t + \psi - \frac{\pi}{3}\right)$$

$$v_{star}(t) = V_{star} \quad (17)$$

This produces the following equation for the branch powers $\overline{P}_{zi}$ $$\begin{pmatrix} \overline{P}_{z1} \\ \overline{P}_{z2} \\ \overline{P}_{z3} \\ \overline{P}_{z4} \\ \overline{P}_{z5} \\ \overline{P}_{z6} \end{pmatrix} = \underbrace{\begin{pmatrix} 0.5 & 0.25 & -0.25 & 0.25 & 1 & 1 \\ -0.25 & -0.5 & 0.5 & 0.25 & -1 & 1 \\ -0.25 & 0.25 & -0.25 & -0.5 & 1 & 1 \\ -0.25 & 0.25 & 0.5 & -0.5 & -1 & 1 \\ -0.25 & 0.25 & -0.25 & 0.25 & 1 & 1 \\ 0.5 & -0.5 & -0.25 & 0.25 & -1 & 1 \end{pmatrix}}_{A_{cir}} \begin{pmatrix} \hat{i}_{cir,1.1} \cdot \hat{v}_{g1} \\ \hat{i}_{cir,1.2} \cdot \hat{v}_{g1} \\ \hat{i}_{cir,2.1} \cdot \hat{v}_{g2} \\ \hat{i}_{cir,2.2} \cdot \hat{v}_{g2} \\ \frac{\sqrt{3}}{18}(Q_2 - Q_1) + V_{star} \cdot I_{cir} \\ -P_1 - P_2 \end{pmatrix}. \quad (18)$$

The matrix $A_{cir}$ is invertible, which is utilized for the regulation described below with reference to FIG. 5. This type of regulation has the advantage that all energy content can be regulated in the converter branches by selecting the circulating current and the energy consumption from the network.

Figure 5:
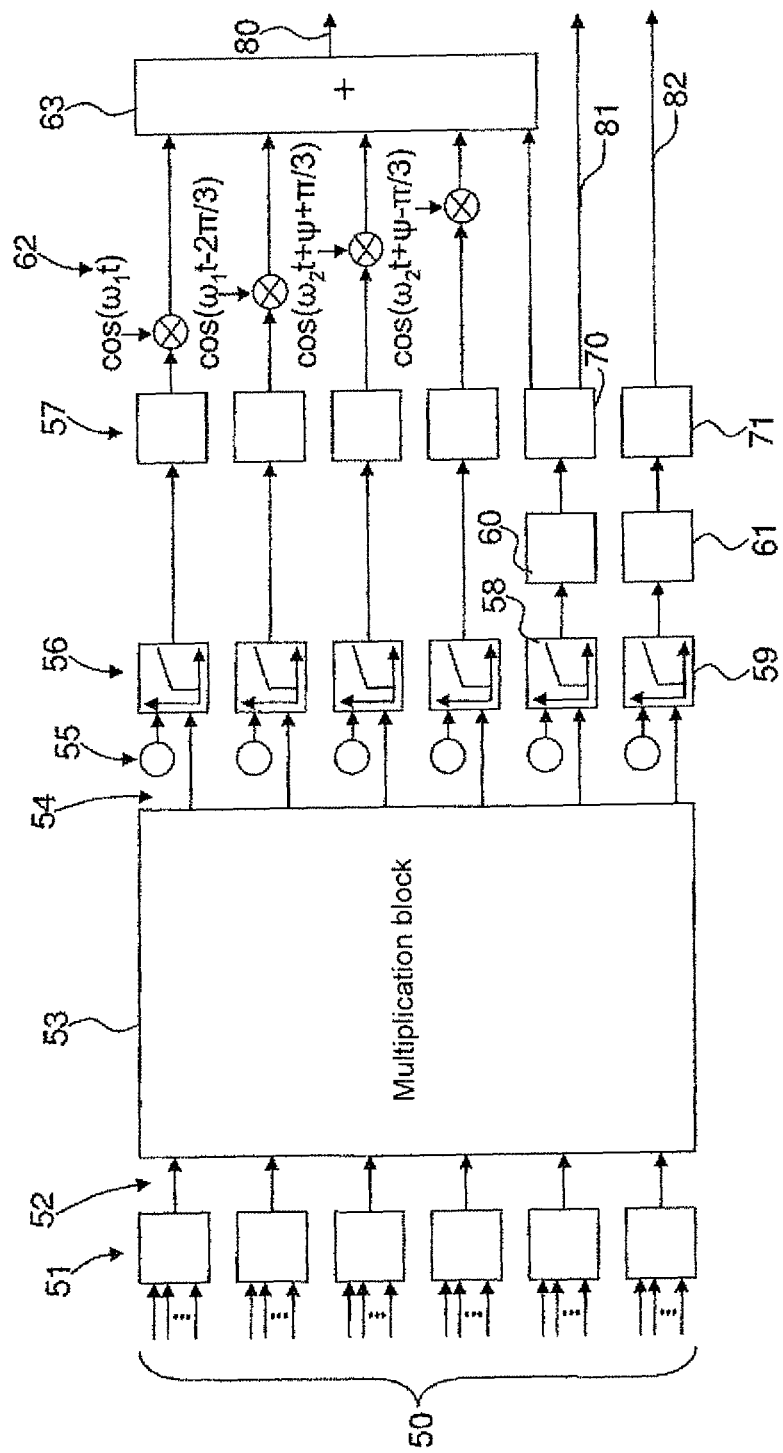

FIG. 5 shows, beginning from the left-hand side, six summation blocks 51, which are each assigned to a converter branch 32, 33, 34, 35, 36, 37. The summation blocks 51 are supplied with input signals 50 from the local control units 12 of the bridge modules 1, e.g. via optical waveguides. Each summation block 51 receives as input signals 50 from each bridge module 1 of the respective converter branch 32, 33, 34, 35, 36, 37 an electrical variable identifying the amount of energy stored in the respective bridge module 1. In the case of bridge modules without battery, as shown in FIG. 2 the voltage to be measured at the capacitor 9 or the square of the voltage as an indicator for the amount of energy stored in a capacitor is transferred as input variable. In the case of a bridge module with battery as shown in FIG. 1, the variable identifying the instantaneous charge of the battery 11 is transferred. In each summation block 51 the input variables supplied to the summation block 51 are summed and converted into a respective branch energy content $E_{zi}$. In principle the variables 52 present at the outputs of the summation blocks 51 could be converted by a regulator, embodied for example as a PI regulator, into required branch powers $\overline{P}_{zi}$. In this case the variables 52 present at the outputs of the summation blocks 51 would then correspond to the vector to the left of the equality sign in the equation 18. In a multiplication block 53 the individual branch powers $\overline{P}_{zi}$ would be multiplied with the inverted matrix $A_{cir}^{-1}$. The vector 54 of output data coming out of the multiplication block 53 would then be supplied directly to the blocks 57. As a result of the linearity of the transformation in block 53 it is however also possible to apply regulator 56 only after the transformation carried out in block 53. This variant is shown in greater detail in FIG. 5. Here the transformed energy contents of block 53 are supplied to six regulators 56, wherein the top four regulators 56 are used for regulation of energy exchange, which is required because different losses occur in the converter branches 32, 33, 34, 35, 36, 37, while the regulator 58 is used for regulating out the displacement power between adjacent converter branches and the regulator 59 for regulating the overall energy content of the cycloconverter 20. The regulators 56, 58, 59 can be embodied for example as PI regulators. The regulators 56, 58, 59 will also be supplied with setpoint variables, e.g. the pre-determined setpoint range of the energy content to which regulation is to be undertaken. The setpoint variables can be different for the individual regulators 56, 58, 59. Through different choice of regulator parameters, i.e. for example P portion and I portion, for the top four regulators 56 on the one hand and for regulators 58 and 59 in each case on the other hand the different dynamics in the occurrence of deviations of the energy content actual value can be taken into account by its setpoint value. Consequently such an arrangement of the regulator 56 downstream of the block 53 compared to upstream of the block 53 is advantageous. In this case the regulator 56 is used to regulate out the energy displacement between adjacent converter branches for the respective selected operating point. The regulator 59 is used to regulate the overall energy content in the selected operating point of the converter.

The output variables of the regulator 56 are supplied to respective range adaptation blocks 57. In the range adaptation blocks 57 the supplied variables are multiplied or divided by the respective fixed, non-changeable variables of the regulation. In the described circulating current regulation the voltages $\hat{v}_{g1}$ and $\hat{v}_{g2}$ are fixed values for example which are not to be regulated. By these the circulating current proportions $\hat{i}_{cir,1,1}, \hat{i}_{cir,1,2}, \hat{i}_{cir,2,1}$ and $\hat{i}_{cir,2,2}$ to be regulated in the top four range adaptation blocks 57 are cleaned. In block 70 the equal variables $I_{cir}$ and $V_{star}$ are created and output. Via the range adaptation in block 71 a setpoint value for an effective power current in the second three-line network 31 is determined. In an advantageous embodiment a pilot control block 60 is connected upstream of block 70. A pilot control block 61 is connected upstream of block 70. Via the pilot control blocks 60, 61 a rapid adaptation to changed conditions, such as setpoint value jumps in the energy supply demand, can be overlaid onto the regulation by the regulators 58, 59. This has the advantage that the regulators 58, 59 can be designed with respect to their regulation parameters for an optimum regulation under stationary conditions and yet there can still be a rapid reaction to setpoint value changes of a greater extent.

Figure 6:
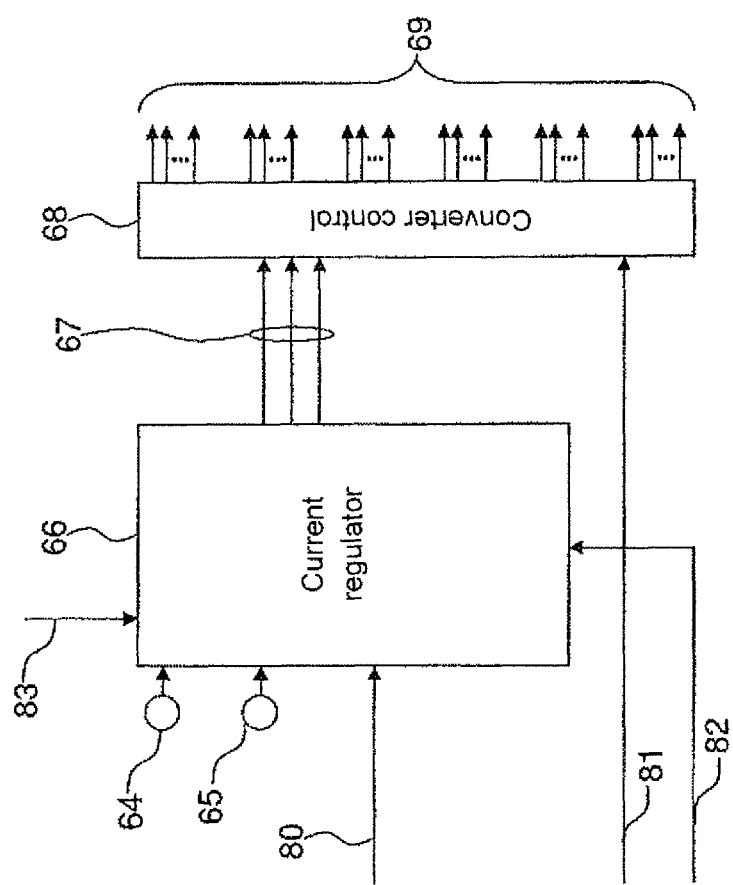

The circulating currents coming from the top four blocks 57 are modulated in modulation blocks 62 with the respective alternating signal. The variables coming from the blocks 62, 70 are added in block 63, which produces as an output variable 80 the circulating current $I_{cir, Soll}$ to be regulated in. Block 63 is also supplied with the circulating current equal components $I_{cir}$ determined in block 70. The equal component of the star point displacement voltage $V_{star}$ also comes from block 70 as output variable 81. A setpoint value of the effective power current is output from block 71 as the output variable 82. FIG. 6 shows the further parts of the regulator to which the previously explained output variables 80, 81, 82 are supplied. The circulating current 80 to be regulated in is fed to a current regulator 66. The current regulator 66 is also supplied with the setpoint value of the effective current 82, the measured actual currents 83 and also further setpoint values 64, 65, such as the setpoint currents in the first three-line network 1 for example and the setpoint value of the reactive currents in the second three-line network 31. From this the current regulator 66 generates output signals 67 which characterize the setpoint voltages in the converter branches. The setpoint voltages 67 are fed to a converter control 68. The converter control 68 is also supplied with the equal component of the star point displacement voltage $V_{star}$.

The converter control 68 controls the distribution to the individual converter branches 32, 33, 34, 35, 36, 37 or the local control units 12. The converter control 68 is used for distributing the supplied input variables, i.e. the voltage to be injected into a converter branch, to the individual bridge modules of the converter branch. Methods already known can be used for this purpose. Thus for example, depending on the current flow direction in the branch in question, there can first be an activation of the bridge module with the smallest or with the greatest intermediate circuit voltage. A further advantageous method as described in the publication by M Dong, B Wu, N Zargari and J Rodriguez "A novel digital modulation scheme for multilevel cascaded h-bridge inverters," In Power Electronics Specialists Conference 2008. PESC 2008. IEEE 2008, pp 1675-1680. Control data 69 is supplied from the converter control 68 to the individual local control units 12.

In a similar way to the use of network-frequency components in the circulating current, an energy content regulation via network-frequency components in the star point displacement voltage is also possible. The regulator structure described with reference to FIG. 5 can likewise be used for this purpose, wherein the following equations apply in this case:

$$i_{cir}(t) = I_{cir} \quad (19)$$

$$v_{star}(t) = \quad (20)$$
$$V_{star} + \hat{v}_{star,1.1} \cdot \cos(\omega_1 t - \varphi_1) + \hat{v}_{star,1.2} \cdot \cos\left(\omega_1 t - \varphi_1 - \frac{2\pi}{3}\right) +$$
$$\hat{v}_{star,2.1} \cdot \cos\left(\omega_2 t + \psi - \varphi_2 + \frac{\pi}{3}\right) + \hat{v}_{star,2.2} \cdot \cos\left(\omega_2 t + \psi - \varphi_2 - \frac{\pi}{3}\right)$$

$$\begin{pmatrix} \bar{P}_{z1} \\ \bar{P}_{z2} \\ \bar{P}_{z3} \\ \bar{P}_{z4} \\ \bar{P}_{z5} \\ \bar{P}_{z6} \end{pmatrix} = \underbrace{\begin{pmatrix} -0.25 & 0.25 & 0 & 0.25 & 1 & 1 \\ 0.25 & -0.25 & 0.25 & 0 & -1 & 1 \\ 0 & -0.25 & -0.25 & 0 & 1 & 1 \\ 0 & 0.25 & -0.25 & 0.25 & -1 & 1 \\ 0.25 & 0 & 0.25 & -0.25 & 1 & 1 \\ -0.25 & 0 & 0 & -0.25 & -1 & 1 \end{pmatrix}}_{A_{cir}} \quad (21)$$

$$\begin{pmatrix} \hat{v}_{star,1.1} \cdot \hat{i}_{g1} \\ \hat{v}_{star,1.2} \cdot \hat{i}_{g1} \\ \hat{v}_{star,2.1} \cdot \hat{i}_{g2} \\ \hat{v}_{star,2.2} \cdot \hat{i}_{g2} \\ \frac{\sqrt{3}}{18}(Q_2 - Q_1) + V_{star} \cdot I_{cir} \\ -P_1 - P_2 \end{pmatrix}.$$

Like $A_{cir}, A_{star}$ is also able to be inverted. Both methods can also be used in combination.

It should be pointed out that the phase offsets used between the individual components of the star point displacement voltage or the circulating current are only examples; for each alternating current system two random displacement angles differing from one another are used here. Other matrices $A_{star}$ or $A_{cir}$ respectively then result, which are however just as invertible and usable for regulation as those specified here.

For operation of the two three-line networks with identical network frequencies the same regulation can be used as that described with reference to FIGS. 4 and 5, wherein the following is to be taken into account. By contrast with the operation of two three-line networks with different frequencies the network voltages—or network currents—influence each other mutually for $\omega_1=\omega_2$, so that the result is average powers in the individual branches dependent on the displacement angle $\psi$. As in the previously considered case of different frequencies the results here is only a single displacement power $P_s$, which occurs with alternating leading signs in neighboring branches. With $$\mu = \frac{\hat{v}_g 2}{\hat{v}_g 1}$$

as abbreviation the displacement power $P_s$ amounts to:

$$P_s = -\frac{\sqrt{3}}{18}(Q_1 - Q_2) + \frac{\sqrt{3}}{9}\left[\frac{Q_2}{\mu} - Q_1\mu\right]\cos\left(\psi - \frac{2\pi}{3}\right) + \frac{\sqrt{3}}{9}\left[\frac{P_2}{\mu} + P_1\mu\right]\cos\left(\psi - \frac{\pi}{6}\right). \quad (22)$$

For the case of $P_2=-P_1$ the displacement power $P_s$ can be compensated for depending on the loader angle by selection of the reactive power in the feeding three-line network 30, by $$Q_1 = \frac{(\mu^2 - 1)P_2\sin\left(\psi + \frac{\pi}{3}\right) + Q_2\cos\left(\psi + \frac{\pi}{3}\right) - \frac{\pi}{2}Q_2}{\mu^2\cos\left(\psi + \frac{\pi}{3}\right) - \frac{\pi}{2}} \quad (23)$$

Since the equation (23) has two pole points, this results in restrictions of the range of values of the regulation. The compensation of the displacement power via the circulating current and the star-point voltage on the other hand functions independently of operating points with appropriate converter dimensioning in a constant range of values. In this case the following applies:

$$I_{cir}V_{star} = \frac{\sqrt{3}}{18}(Q_1 - Q_2) - \frac{\sqrt{3}}{9}\left[\frac{Q_2}{\mu} - Q_1\mu\right]\cos\left(\psi - \frac{2\pi}{3}\right) - \frac{\sqrt{3}}{9}\left[\frac{P_2}{\mu} + P_1\mu\right]\cos\left(\psi - \frac{\pi}{6}\right). \quad (24)$$

Or with the use of alternating variables $$\hat{i}_{cir}\hat{v}_{star} = \frac{\sqrt{3}}{9}(Q_1 - Q_2) - \frac{2\sqrt{3}}{9}\left[\frac{Q_2}{\mu} - Q_1\mu\right]\cos\left(\psi - \frac{\pi}{3}\right) - \frac{2\sqrt{3}}{9}\left[\frac{P_2}{\mu} + P_1\mu\right]\cos\left(\psi - \frac{\pi}{6}\right). \quad (25)$$

The blocks 51, 53, 56, 57, 58 shown in FIG. 5 can be realized in the form of hardware or software modules, even combined with one another.

The invention claimed is:

1. A method for controlling a cycloconverter comprising six converter branches connected in series, each of the converter branches comprising electrical energy converters, the cycloconverter configured to connect a first three-line network to a second three-line network, the method comprising:

controlling energy transfer from the first three-line network to the second three-line network or vice versa in accordance with at least one of energy demand, energy supply and reactive power criteria, and regulating an amount of electrical energy stored in each converter branch or an electrical variable identifying the amount of electrical energy to a predetermined setpoint range.

2. The method of claim 1, wherein regulating the amount of electrical energy or the electrical variable comprises controlling a reactive power generated by the cycloconverter in at least one of the first three-line network and the second three-line network.

3. The method of claim 2, wherein the reactive power supplied to the first three-line network is identical to the reactive power supplied to the second three-line network.

4. The method of claim 1, wherein regulating the amount of electrical energy or the electrical variable comprises controlling at least one of a circular electric current flowing in a circular pattern through all six series-connected converter branches and a differential star point voltage present between respective star points of the first three-line network and the second three-line network.

5. The method of claim 4, wherein the differential star point voltage is applied as a DC voltage and the circular electric current is applied as a direct current.

6. The method of claim 4, further comprising applying a circular electric current and a differential star point voltage, which have identical frequency that is different from a frequency of the first three-line network and a frequency of the second three-line network and which are either in-phase or out-of-phase in relation to each other.

7. The method of claim 4, wherein a current component having a frequency of at least one of the first three-line network and the second three-line network is superimposed on the circular electric current.

8. The of claim 4, wherein a voltage component having a frequency of at least one of the first three-line network and the second three-line network is superimposed on the differential star-point voltage.

9. The method of claim 4, wherein
 a) a current component having a frequency of at least one of the first three-line network and the second three-line network is superimposed on the circular electric current, and
 b) a voltage component having a frequency of at least one of the first three-line network and the second three-line network is superimposed on the differential star-point voltage.

10. The method of claim 1, wherein the cycloconverter comprises a plurality of controllers for controlling different control variables of the cycloconverter, with one of the plurality of controllers controlling an overall energy content of the cycloconverter at a respective operating point.

11. The method of claim 1, wherein the cycloconverter comprises a plurality of controllers for controlling different control variables of the cycloconverter, with one of the plurality of controllers controlling energy displacement between adjacent converter branches.

12. The method of claim 1, wherein the cycloconverter comprises a plurality of controllers for controlling different control variables of the cycloconverter, with four of the plurality of controllers controlling energy balance between converter branches that are not directly adjacent.

13. An electronic control device for a cycloconverter, the cycloconverter comprising six converter branches connected in series, each of the converter branches comprising electrical energy converters, the cycloconverter connecting a first three-line network to a second three-line network, the electronic control device comprising:

a converter operation controller controlling energy transfer from the first three-line network to the second three-line network or vice versa in accordance with at least one of energy demand, energy supply and reactive power criteria, and an energy content controller regulating an amount of electrical energy stored in each converter branch or an electrical variable identifying the amount of electrical energy to a predetermined setpoint range.

14. A cycloconverter comprising six converter branches connected in series, each of the converter branches comprising electrical energy converters, the cycloconverter connecting a first three-line network to a second three-line network and comprising a control device which includes a converter operation controller controlling energy transfer from the first three-line network to the second three-line network or vice versa in accordance with at least one of energy demand, energy supply and reactive power criteria, and an energy content controller regulating an amount of electrical energy stored in each converter branch or an electrical variable identifying the amount of electrical energy to a predetermined setpoint range.

15. A computer program having program code embodies on a non-transitory computer-readable medium, wherein the computer program when read into a processor operatively connected to a cycloconverter, the cycloconverter comprising six converter branches connected in series, each of the converter branches comprising electrical energy converters, the cycloconverter connecting a first three-line network to a second three-line network, causes the processor to:

control energy transfer from the first three-line network to the second three-line network or vice versa in accordance with at least one of energy demand, energy supply and reactive power criteria, and regulate an amount of electrical energy stored in each converter branch or an electrical variable identifying the amount of electrical energy to a predetermined setpoint range.

* * * * *